US008640120B2

(12) United States Patent
Gutha et al.

(10) Patent No.: US 8,640,120 B2
(45) Date of Patent: Jan. 28, 2014

(54) APPROACH TO AUTOMATICALLY ENCODE APPLICATION ENUMERATION VALUES TO ENABLE REUSE OF APPLICATIONS ACROSS VARIOUS CONTROLLERS

(75) Inventors: Stalin Gutha, Bangalore (IN); Paul Wacker, Plymouth, MN (US); Kevin B. Moore, Chaska, MN (US)

(73) Assignee: Honeywell International Inc., Morristown, NJ (US)

( * ) Notice: Subject to any disclaimer, the term of this patent is extended or adjusted under 35 U.S.C. 154(b) by 1065 days.

(21) Appl. No.: 12/650,485

(22) Filed: Dec. 30, 2009

(65) Prior Publication Data

US 2011/0160879 A1    Jun. 30, 2011

(51) Int. Cl.
G06F 9/44 (2006.01)
G05B 15/00 (2006.01)

(52) U.S. Cl.
USPC .................................... 717/173; 700/1

(58) Field of Classification Search
None
See application file for complete search history.

(56) References Cited

U.S. PATENT DOCUMENTS

| | | | | |
|---|---|---|---|---|
| 2003/0078677 | A1* | 4/2003 | Hull et al. | 700/1 |
| 2003/0115573 | A1* | 6/2003 | Syme et al. | 717/111 |
| 2005/0230490 | A1 | 10/2005 | Pouchak et al. | |
| 2006/0067209 | A1* | 3/2006 | Sheehan et al. | 370/216 |
| 2008/0004754 | A1 | 1/2008 | Pouchak et al. | |
| 2008/0010049 | A1 | 1/2008 | Pouchak et al. | |
| 2008/0015739 | A1 | 1/2008 | Wacker | |
| 2008/0016493 | A1 | 1/2008 | Pouchak et al. | |
| 2008/0115153 | A1 | 5/2008 | Brindle | |
| 2008/0125914 | A1 | 5/2008 | Wacker | |
| 2009/0113037 | A1 | 4/2009 | Pouchak | |
| 2009/0287736 | A1* | 11/2009 | Shike et al. | 707/103 R |
| 2010/0100583 | A1 | 4/2010 | Pouchak | |

OTHER PUBLICATIONS

Honeywell Spyder Bacnet User's Guide, 242 pages, Revised Jul. 2009.
Honeywell Spyder User's Guide 202 pages, Released Jul. 2007.
Siemens, BACnet for DESIGO 27 Pages, prior to Dec. 30, 2009.

* cited by examiner

Primary Examiner — Hyun Nam
(74) Attorney, Agent, or Firm — Seager Tufte & Wickhem LLC.

(57) ABSTRACT

An approach to automatically encode application enumeration values to enable reuse of applications across controller of different protocols. Protocols may use different sets of enumerations to denote various application values and states. The present approach may permit defining a common set of enumerations which can be encoded automatically by a tool that enables reuse. Application designers may define enumerations to be used by the control application and the tool will automatically encode them into communication protocol specific enumeration values.

18 Claims, 6 Drawing Sheets

APPROACH TO AUTOMATICALLY ENCODE APPLICATION ENUMERATION VALUES TO ENABLE REUSE OF APPLICATIONS ACROSS VARIOUS CONTROLLERS

RELATED APPLICATIONS

Related co-pending applications include application Ser. No. 12/650,385, filed Dec. 30, 2009, entitled "A Graphical Approach to Setup Data Sharing between Two Controllers"; application Ser. No. 12/650,447, filed Dec. 30, 2009, entitled "A Mechanism for Constructing Generic Control Logic including Versions in Various Protocols"; application Ser. No. 12/650,467, filed Dec. 30, 2009, entitled "Protocol Independent Programming Environment"; application Ser. No. 12/650,476, filed Dec. 30, 2009, entitled "Priority Selection Mechanism for Driving Outputs from Control Logic for Controllers of Various Protocols"; application Ser. No. 12/650,497, filed Dec. 30, 2009, entitled "An Approach for Switching between Point Types without Affecting Control Logic"; and application Ser. No. 12/650,513, filed Dec. 30, 2009, entitled "Changeable BACnet Interface".

Application Ser. No. 12/650,385, filed Dec. 30, 2009, entitled "A Graphical Approach to Setup Data Sharing between Two Controllers", is hereby incorporated by reference. Application Ser. No. 12/650,447, filed Dec. 30, 2009, entitled "A Mechanism for Constructing Generic Control Logic including Versions in Various Protocols", is hereby incorporated by reference. Application Ser. No. 12/650,467, filed Dec. 30, 2009, entitled "Protocol Independent Programming Environment", is hereby incorporated by reference. Application Ser. No. 12/650,476, filed Dec. 30, 2009, entitled "Priority Selection Mechanism for Driving Outputs from Control Logic for Controllers of Various Protocols", is hereby incorporated by reference. Application Ser. No. 12/650,497, filed Dec. 30, 2009, entitled "An Approach for Switching between Point Types without Affecting Control Logic", is hereby incorporated by reference. Application Ser. No. 12/650,513, filed Dec. 30, 2009, entitled "Changeable BACnet Interface", is hereby incorporated by reference.

U.S. patent application Ser. No. 12/256,444, filed Oct. 22, 2008, is hereby incorporated by reference. U.S. patent application Ser. No. 11/670,911, filed Feb. 2, 2007, is hereby incorporated by reference. U.S. patent application Ser. No. 11/620,431, filed Jan. 5, 2007, is hereby incorporated by reference. U.S. patent application Ser. No. 11/427,750, filed Jun. 29, 2006, is hereby incorporated by reference. U.S. patent application Ser. No. 11/564,797, filed Nov. 29, 2006, is hereby incorporated by reference. U.S. patent application Ser. No. 11/559,706, filed Nov. 14, 2006, is hereby incorporated by reference. U.S. patent application Ser. No. 10/809,115, filed Mar. 25, 2004, is hereby incorporated by reference.

BACKGROUND

The invention pertains to programming and particularly to various programming environments. More particularly, the invention pertains to heating, ventilation and air conditioning (HVAC) environments.

SUMMARY

The invention is an approach to automatically encode application enumeration values to enable reuse of applications across controllers having various protocols. This approach may increase productivity of application engineers.

DESCRIPTION

An application, as referred to herein, may be a group of function blocks interconnected to form control logic. The application may be downloaded to the controller to run the control logic in the controller. A wiresheet may be a view in a workbench, in conjunction with a Spyder™ (Spyder) tool, that provides a programming and graphical environment to allow one to drag and drop functional blocks and macros to define the application logic. Functional blocks may be the atomic program objects that define specific functions. A macro may be a set of function blocks that define a specific functionality. The workbench may be a Niagara™ (Niagara) workbench.

The Spyder tool may be an add-on module to existing Niagara framework modules. The tool may complement Niagara for providing the graphical environment via the workbench for programming a Spyder controller. Three flavors of the Spyder tool may include LonWorks™ (Lon™, Lon, LonWorks) and BACnet (Bacnet), Lon only and BACnet only. There may be other flavors. Other frameworks and tools may be utilized for designing and implementing various kinds of control logic and applications. The flavors may be regarded as protocols or standards. BACnet is a communications protocol for building automation and control networks.

Lon and BACnet standards may use different sets of enumerations (enums) to denote various application (app) values and states. Direct digital control (DDC) applications should have an ability to accept such values sent from other nodes on the bus and also should have the ability to issue requests/commands to other nodes on the bus using the standard enumerated values. Since the range and actual values used may be different between Lon and BACnet, creating a generic application that can be used in a Lon or BACnet controller becomes a challenge. Without the present approach, application developers may be forced to maintain two sets of applications just to maintain the enumeration differences.

For example, in Lon, the (standard network variable type) SNVT_Occupancy enum used to convey occupancy state may have the values of 0=occupied, 1=unoccupied, 2=bypass, and 3=standby. The same enumeration values cannot necessarily be used in BACnet as, for example, the BACnet MSV object does not support the value 0 as a valid state. The corresponding values or states for BACnet may be 1=unoccupied, 2=occupied and 3=bypass. SNVT may be regarded as a standard network variable type. UNVT may be regarded as a user network variable type.

The present approach may allow defining a common set of enumerations that can be encoded automatically by a tool to enable reuse. The approach may allow application developers to define the enumerations to be used by the control application and the tool will automatically encode them into communication protocol specific enumeration/state values.

The approach may utilize an "encode" or an "offset" function block available in the Spyder function block engine. The mapping between user defined application enums and communication protocol specific enums may be performed automatically by the tool by inserting an encode function block between the input/output (IO) point and the application logic.

This may be done seamlessly without the application developer's intervention. This may also allow the application developer to focus on how to build the control application with the required enumerations/states without being concerned about translating the states to multiple protocol-specific values The programming tool may translate the application logic into configuration files which are downloaded to the controller. During the translation process, the tool may automatically insert an encode block to map application enums compatible with the rules of the respective communication protocol. The application developer may define a generic set of application enums when he configures a Point in the application logic.

The present approach may be used to create generic applications by using encode blocks to map enumerations. First, a user may create control logic and connect an enum input point. Then the user may configure the enum values for the input point. Next, the user may drop the generic application in a Lon or BACnet controller. Subsequently, the user may invoke a download of the BACnet device. A tool may download the application after inserting an Encode block. Then, the user may invoke a download of the Lon device. A tool may download the application "as-is" to a controller.

Application developers may, for instance, avoid MV's and just use analog values (AV's) to exchange enums instead. A tool could potentially automatically map enumerations defined for a multistate value (MSV) object through an encode function block. Further, the tool could map the enumerations automatically without user knowledge. This may mean that for an input MSV object, the tool would automatically map the shared variable to an input of the encode block. And for an output MSV object, the tool may route the function block logic through an encode block and an output of the encode block could be mapped to the shared variable.

Figure 1:
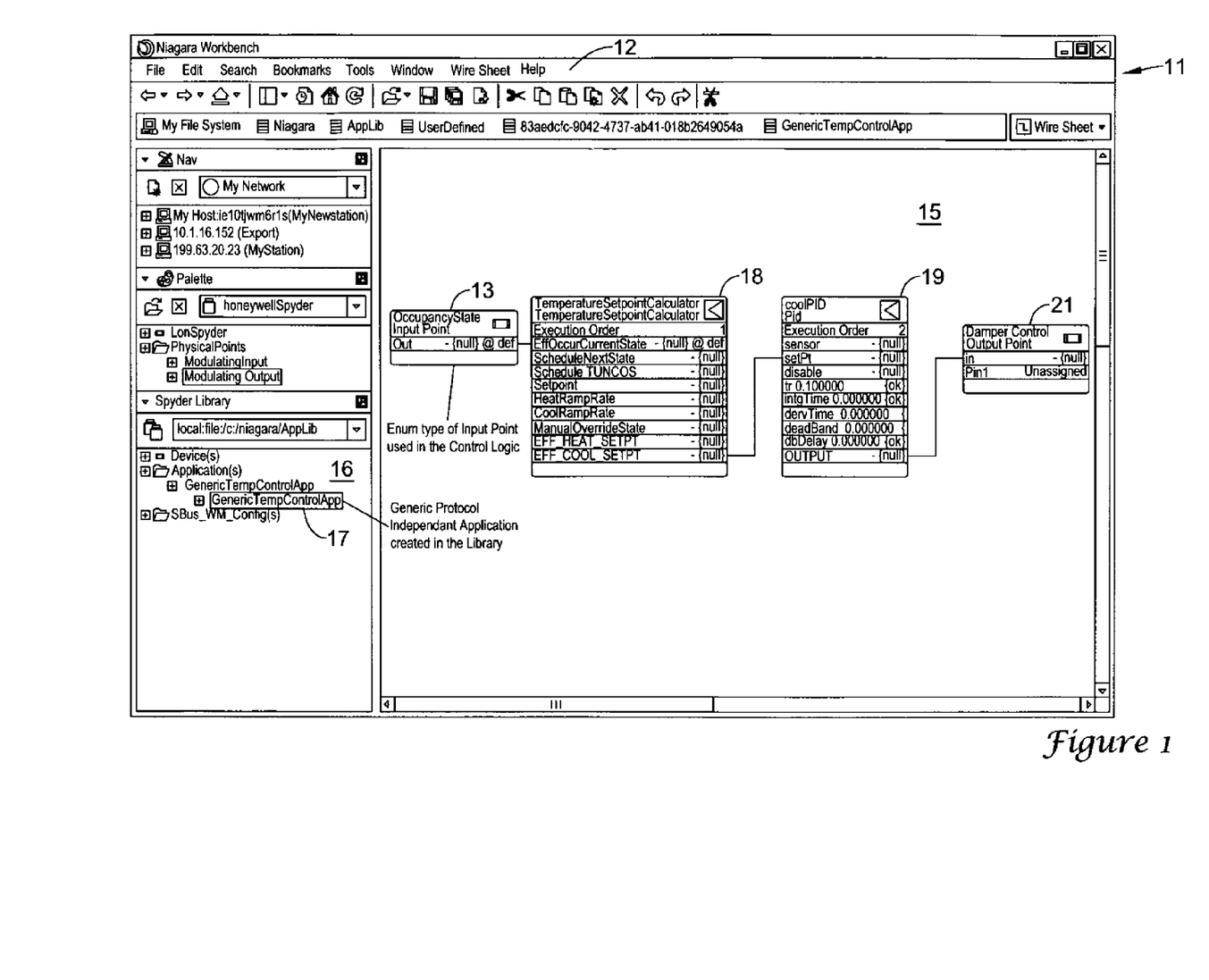
FIG. 1 is a diagram of control logic and a connection for an enumeration input point.

A first step of the present approach may be illustrated in a screen 11 of FIG. 1. The step may be for a user to create control logic and connect an enum input point. An input point 13 for occupancy state is shown on screen area 15 of a Niagara workbench 12. Input point 13 may be an example of an enum type of input point used in control logic. In a lower left pane 16 is a Spyder Library palette. A generic protocol-independent application may be created in the library as indicated by a label 17 entitled "GenericTempControlApp". Input point 13 may be connected to a temperature setpoint calculator function block 18. An output of function block 18 may be connected to a cool PID (proportional-integral-derivative) function block 19. An output of function block 19 may be connected to a damper control output point 21. Output point 21 may be for connection to a damper control actuator.

Figure 2:
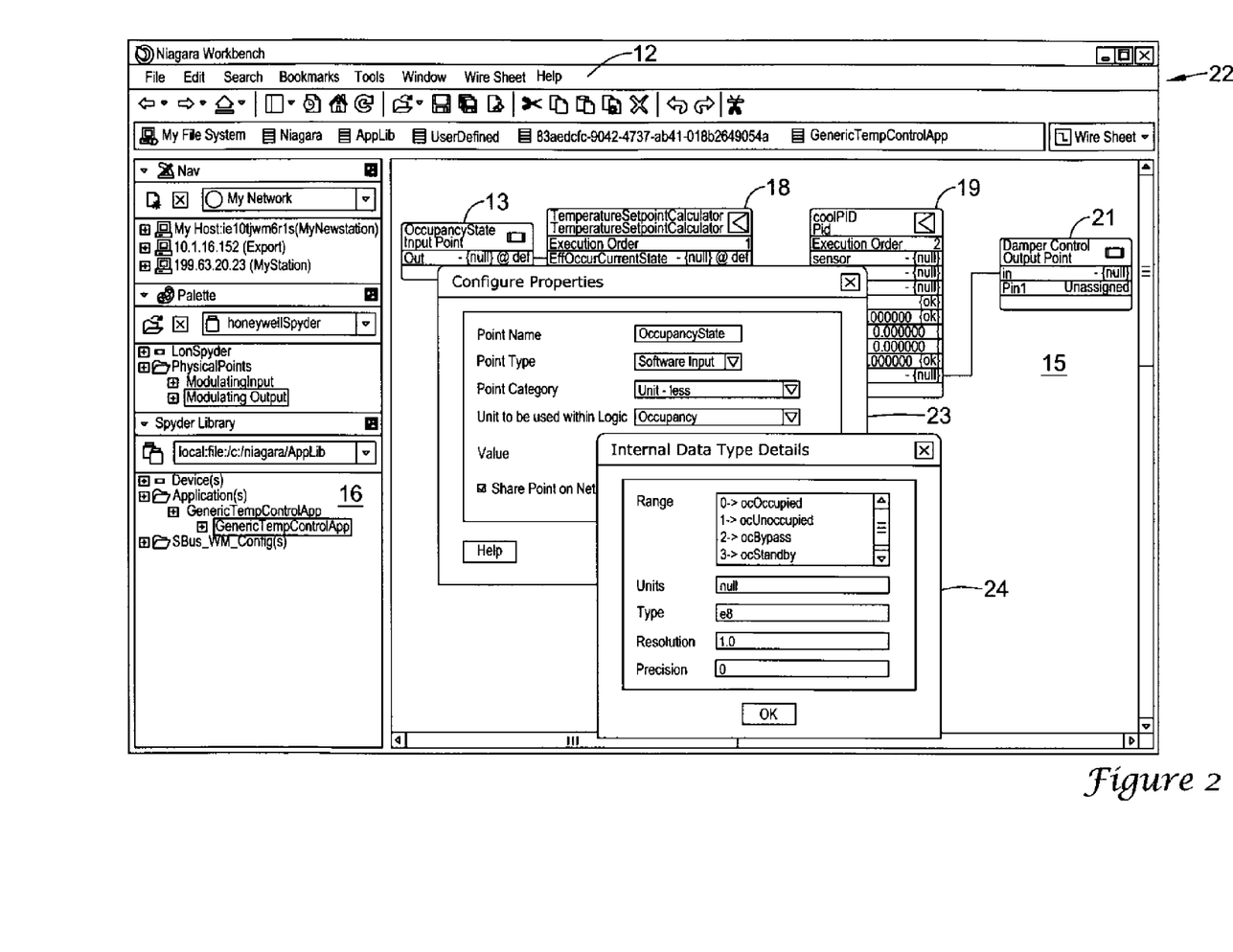
FIG. 2 is a diagram of a configure properties dialog box and an internal data type details box for a user to configure the enumeration values for the input point.

A second step may be illustrated in screen 22 of FIG. 2. The step may be for a user to configure the enum values for the input point 13. A configure properties dialog box 23 of point 13 may be brought on to screen area 15. From box 23 an internal data type details box 24 may be shown. Box 24 reveals a range of these details which lists enum values of 0 for occupied, 1 for unoccupied, 2 for by pass and 3 for standby. For example, one may note that the enum value of "0" is not necessarily a valid BACnet MSV state value but is a valid Lon SNVT_occupancy value.

Figure 3:
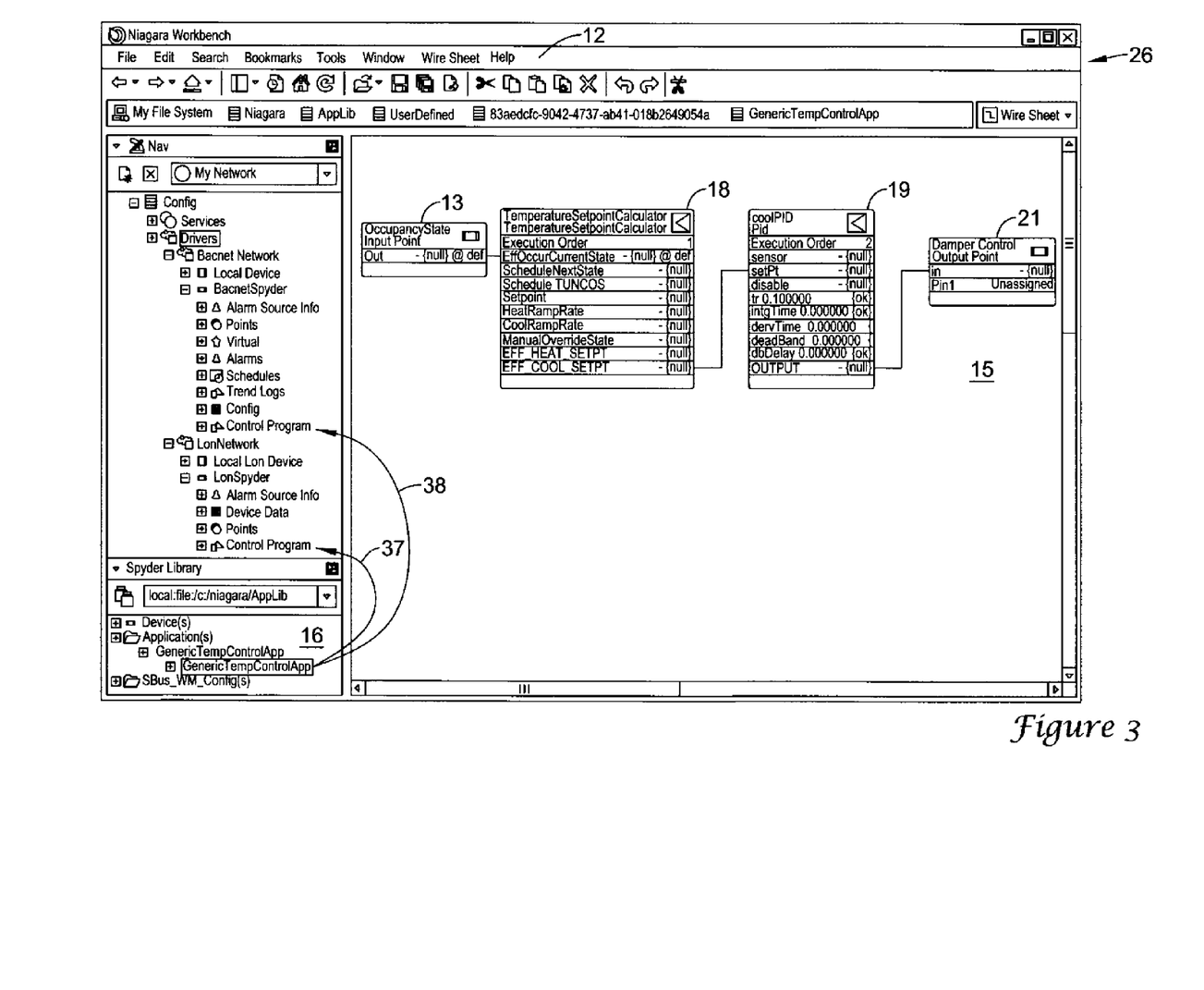
FIG. 3 is a diagram illustrating an approach to drop off the same generic application in a Lon™ or BACnet controller.
Figure 4:
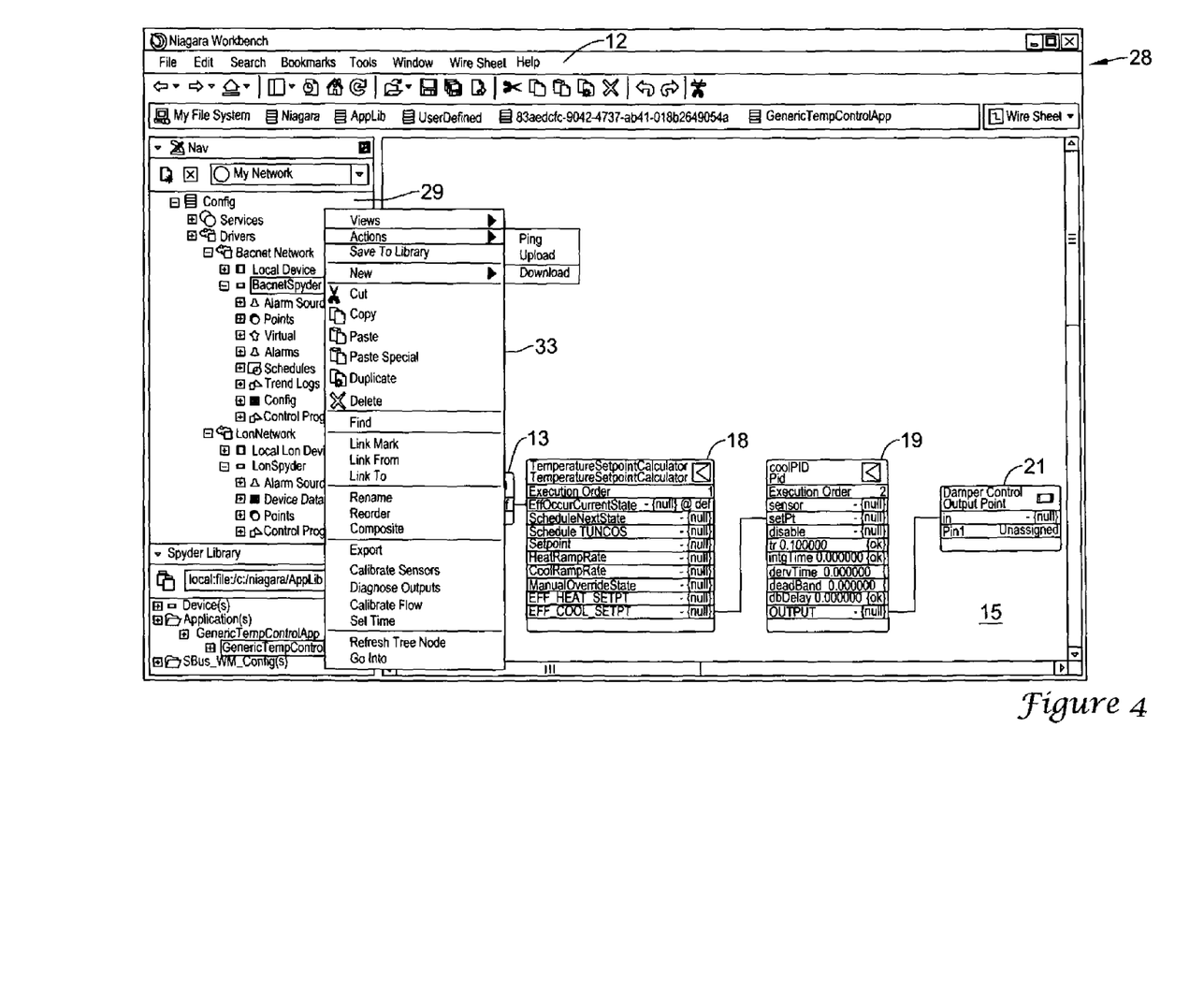
FIG. 4 is a diagram illustrating an approach to invoke a download of a BACnet device.
Figure 5:
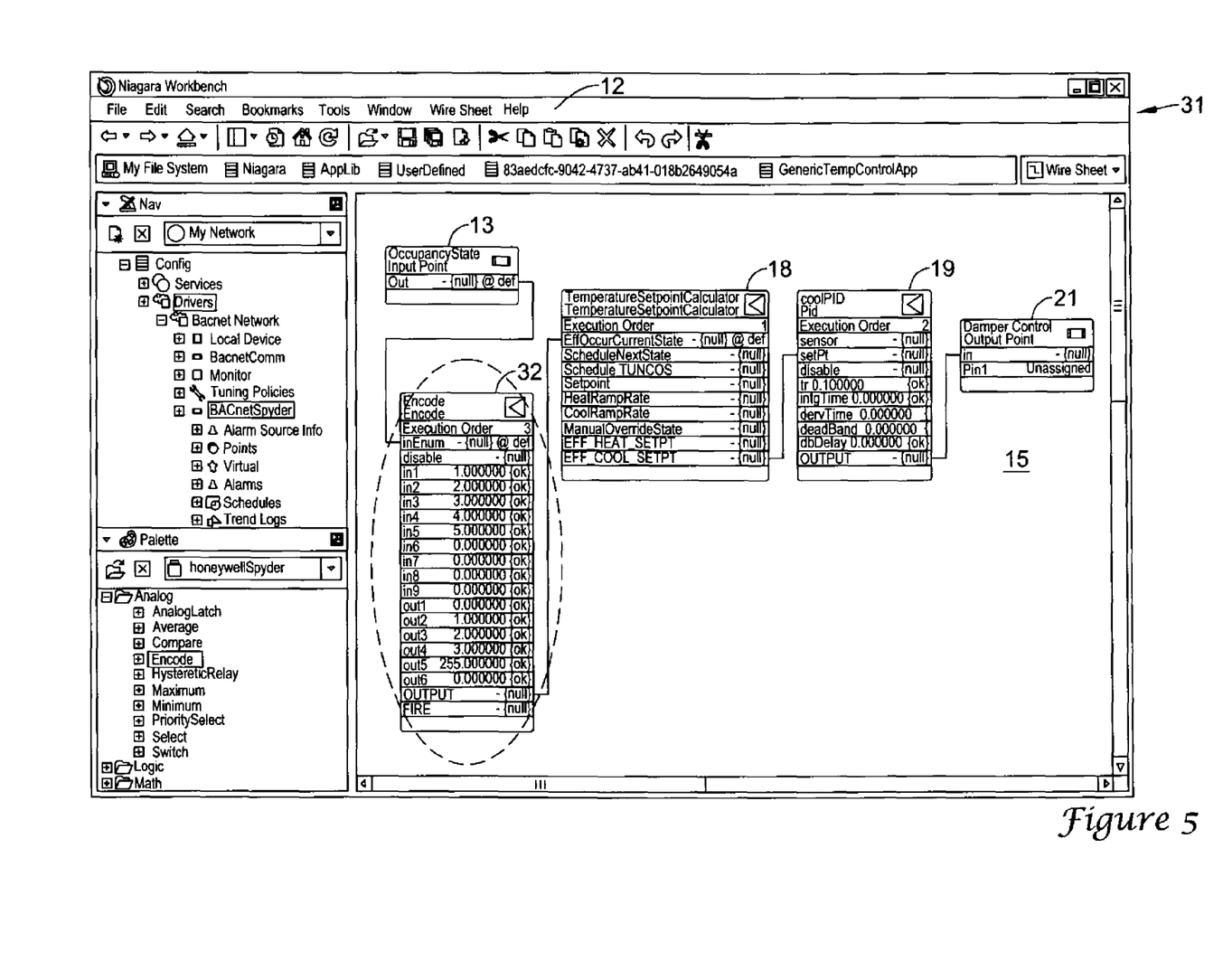
FIG. 5 is a diagram illustrating a tool for downloading an application after inserting a code block between the occupancy status input point and a temperature setpoint calculator function block.

A third step may be illustrated in screen 26 of FIG. 3. The step may be for a user to drop the same generic application in a Lon Spyder or BACnet Spyder controller, as indicated by arrows 37 and 38, respectively. A first part of a fourth step may be illustrated in a screen 28 of FIG. 4. The first part of the fourth step may be for a user to invoke a download of a BACnet device. In an upper left pane 29, clicking on BACnet Spyder may drop down a menu 33 with "Actions" which provide three choices—"Ping", "Upload" and "Download". "Download" may be clicked on to download the BACnet device. A second part of the fourth step may be illustrated in a screen of FIG. 5. The second part of the step may be for a tool to download the application after inserting an encode block 32 which is inserted between the occupancy stat input point 13 and the temperature setpoint calculator function block 18. The tool may automatically insert the encode block 32 to map the enumerations defined to BACnet states as indicated by the following: BACnet state 1=0 (Unocc) in the app; BACnet state 2=1 (Occ) in the app; and BACnet state 3=2 (Bypass) in the app. The latter values are those of the Lon app.

Figure 6:
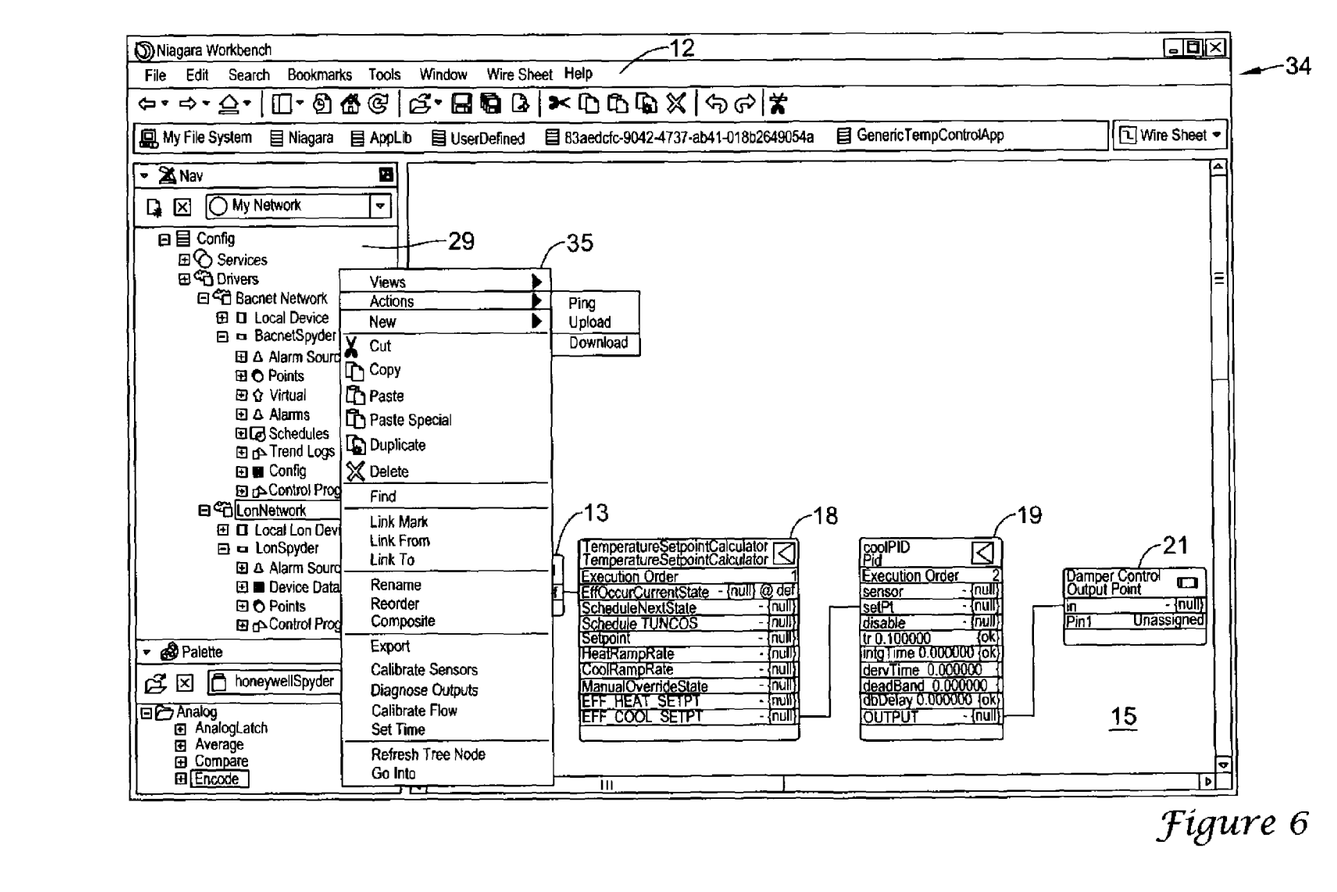
FIG. 6 is a diagram showing an approach where a download of a Lon™ device is invoked and a tool to download an application "as-is" to a controller.

A first part of a fifth step may be illustrated in a screen 34 of FIG. 6. The first part may be for a user to invoke a download of a Lon device. In the upper left pane 29, clicking on Lon-Network may drop down a menu 35 with Actions which have three choices of Ping, Upload and Download. "Download" may be clicked on to download the Lon device. A second part of the fifth step may be for a tool to download the app "as-is" to a controller. The previous downloads are to the controller.

A Spyder tool may offer a graphical environment to program the Spyder controller. One may use the wiresheet view in the engineering mode to use physical points, software points, and function blocks to build an application in the control program. The physical points, software points, and function blocks may be accessed using a palette. One may drag these items on to the wiresheet and connect them, based on one's need, to develop application logic. The logic that one creates may then be stored in a Spyder library for reuse. Upon being satisfied with the logic one has created, one may download the same to the controller. The logic thus created may be tested for correctness using the simulation and online debugging modes.

One may note that changing network configuration input (NCI) values, configuration of a schedule block, or daylight savings option, puts the application in a quick download pending state. As long as the application has been downloaded at least once to the controller, these changes just trigger a quick download to the controller.

One may use the control program option to program the Spyder tool. To do this, one may expand LonSpyder or BACnetSpyder in the Nav palette and double-click control program to display the wiresheet view; display the palette (from the menu bar, select Window>Sidebars>Palette to display the palette).

The palette may appear on the left pane with the following items. Lon Spyder is a device that one may drag on to the Lon Network in the Nav palette to create a new device. Note that one cannot drop this on to the wiresheet of any macro or control program or application. BACnet Spyder is a device that one may drag on to the BACnet Network in the Nav palette to create a new device. It may be noted that one cannot drop this on to the wiresheet of any macro or control program or application. Physical points may be modulating and binary inputs or outputs. Software points may be used to create a network input, network setpoints, or a network output.

Additional items may include analog function blocks, logic function blocks, math function blocks, control function blocks, data-function function blocks, zone arbitration function blocks, and built-in function blocks.

It may be noted that a macro may be a group of functional blocks grouped together that define a specific functionality. Commonly used program elements may be defined as macros so that they could be reused across applications. An application may include macros and logic that one can define and use in applications. Standard applications may be provided for the Spyder used to build application logic.

One may drag any of these noted items on to the wiresheet of a control program in its engineering mode and make the connections between physical points, software points, and function blocks to create a control program or an application.

A wiresheet view may be used to drag the Physical points and function blocks to build the application logic. One may save a logic created to be used later and also shared with other users. One may build several applications and store them in a Spyder library along with standard applications.

After one has created the application logic and tested the logic using the simulation feature, the application logic may be downloaded to the controller. To download the application logic, one may: 1) on the Nav palette, right-click the device and select Actions>Download (the download dialog box may appear); and 2) select True under full download for a full download or false for a quick download. One may note that a quick download just downloads the modified items from a previous download where as with a full download the entire configuration may be downloaded to the controller replacing the existing configuration. However, if changes have been made to the SBus (Sylk-Bus or sensor bus) wall module (2-wire) by an operator/tenant locally from the display on the wall module, and a full download is performed, the Spyder tool may download the entire configuration to the controller except the SBus wall module configuration. This may be done to avoid losing any changes made locally on the SBus wall module during a download operation. Then at 3), one may click OK. The application logic may be downloaded to the controller based on one's selection.

In the present specification, some of the matter may be of a hypothetical or prophetic nature although stated in another manner or tense.

Although the present system has been described with respect to at least one illustrative example, many variations and modifications will become apparent to those skilled in the art upon reading the specification. It is therefore the intention that the appended claims be interpreted as broadly as possible in view of the prior art to include all such variations and modifications.

What is claimed is:

1. A method for encoding application enumeration values comprising:
   creating control logic;
   connecting an input point, having an enumeration value, to the control logic;
   configuring the enumeration value for the input point;
   constructing a generic application;
   dropping the generic application in controllers having different protocols;
   invoking a download of a controller having a first protocol;
   inserting an encode block in the control logic which maps enumerations defined to the controller having the first protocol; and
   downloading the application from the controller having the first protocol.

2. The method of claim 1, further comprising downloading a controller having a second protocol.

3. The method of claim 2, further comprising downloading the application to the controller having the second protocol.

4. A system for encoding application enum values, comprising:
   a programming environment having a display and a controller, the controller configured to store a generic protocol-independent application, comprising:
      control logic: and
      an enum input/output (IO) point connected to the control logic;
   a tool for mapping user-defined application enums and communication protocol-specific enums; and
   wherein the enum IO point has values which are configured; and
   wherein the mapping application enums compatible with rules of a respective communication protocol occurs automatically by the tool when an encode function block is inserted between the IO point and the control logic.

5. The system of claim 4, further comprising a tool for translating the control logic into configuration files to be downloaded to a controller.

6. The system of claim 4, wherein the mapping occurs without intervention or knowledge by a user.

7. The system of claim 6, wherein a user defines a generic set of application enums when the values of the IO point are configured in the control logic of the application.

8. The system of claim 7, wherein the generic application is dropped in at least one of two or more controllers each having a different control protocol.

9. The system of claim 8, wherein a user invokes a download of a first communications protocol for building automation and control networks device.

10. The system of claim 8, wherein a user uses a tool to download the application after an insertion of an encode block.

11. The system of claim 10, wherein a user invokes a download of a second control protocol device.

12. The system of claim 11, wherein the tool downloads the application "as-is" to a controller.

13. A system for encoding comprising:
    a programming environment having a display and a controller, the controller configured to store a control logic application having common enumerations to denote various application values and states; and
    a tool for mapping user-defined application enums and communication protocol-specific enums wherein the mapping of application enums compatible with a respective communication protocol occurs automatically and encodes the common enumerations into communication protocol specific enumerations.

14. The system of claim 13, wherein the tool comprises an encode function block for mapping between user defined application enumerations and communication protocol specific enumerations.

15. The system of claim 14, wherein the communication protocol specific enumerations are protocol specific enumerations.

16. The system of claim 15, wherein the control logic application is dropped into a controller having a first protocol and a second controller having a second protocol.

17. The system of claim 16, wherein the tool maps enumerations automatically without awareness by a user of the control logic application.

18. The system of claim 14, wherein the encode function is inserted between an in or out point and the control logic application.

\* \* \* \* \*